United States Patent
John et al.

(10) Patent No.: US 11,572,181 B2
(45) Date of Patent: Feb. 7, 2023

(54) STRETCH CONTROL SYSTEM FOR INFLATABLE EVACUATION SLIDE

(71) Applicant: Goodrich Corporation, Charlotte, NC (US)

(72) Inventors: Poly Puthur John, Trivandrum (IN); Jeffrey Martin Werbelow, Phoenix, AZ (US); Nikhil Anthony Saldanha, Bangalore (IN)

(73) Assignee: Goodrich Corporation, Charlotte, NC (US)

( * ) Notice: Subject to any disclaimer, the term of this patent is extended or adjusted under 35 U.S.C. 154(b) by 86 days.

(21) Appl. No.: 17/003,408

(22) Filed: Aug. 26, 2020

(65) Prior Publication Data

US 2021/0354835 A1 Nov. 18, 2021

(30) Foreign Application Priority Data

May 15, 2020 (IN) .............................. 202041020616

(51) Int. Cl.
*B64D 25/14* (2006.01)
*B60C 29/00* (2006.01)
*F16K 17/32* (2006.01)
*F16K 17/38* (2006.01)
*F16K 15/20* (2006.01)

(52) U.S. Cl.
CPC .............. *B64D 25/14* (2013.01); *F16K 17/32* (2013.01); *B63C 9/24* (2013.01); *F16K 15/207* (2013.01); *F16K 17/38* (2013.01)

(58) Field of Classification Search
CPC ........... B64D 25/14; B63C 9/24; F16K 17/20; F16K 17/18
See application file for complete search history.

(56) References Cited

U.S. PATENT DOCUMENTS

| | | | |
|---|---|---|---|
| 9,290,144 B1 | 3/2016 | Cox et al. | |
| 10,946,971 B2* | 3/2021 | John | A62B 1/20 |
| 2003/0188799 A1* | 10/2003 | Cessac | F16L 55/1015 141/387 |
| 2004/0090053 A1* | 5/2004 | White | B60R 21/0156 280/735 |
| 2006/0244581 A1* | 11/2006 | Breed | B60C 23/0408 340/447 |
| 2014/0069181 A1* | 3/2014 | Singh | B60C 23/0408 73/146.3 |
| 2017/0239821 A1* | 8/2017 | Lessing | B25J 13/088 |
| 2018/0201381 A1* | 7/2018 | Volny | A62B 1/20 |

(Continued)

FOREIGN PATENT DOCUMENTS

WO 2015026188 2/2015

*Primary Examiner* — Joshua J Michener
*Assistant Examiner* — Cindi M Curry
(74) *Attorney, Agent, or Firm* — Snell & Wilmer L.L.P.

(57) ABSTRACT

An inflation control system for an inflatable is disclosed. In various embodiments, the inflation control system includes a source of a pressurized gas; a valve module connected to the source of the pressurized gas and configured to control a flow of the pressurized gas to the inflatable; a stretch sensor configured for mounting to the inflatable and to provide a real-time stretch data of an elastic deformation of the inflatable; and a controller configured to receive the real-time stretch data and to transmit a control signal to the valve module to control the flow of the pressurized gas to the inflatable.

17 Claims, 5 Drawing Sheets

(56) References Cited

U.S. PATENT DOCUMENTS

2018/0334256 A1* 11/2018 Haynes .................. B64D 25/14
2019/0047463 A1    2/2019 Rizkallah et al.
2019/0112059 A1*  4/2019 Haynes .................. B64D 25/14
2019/0186504 A1*  6/2019 Werbelow ............... F04F 5/461
2020/0094976 A1*  3/2020 John ...................... B64D 25/14

* cited by examiner

STRETCH CONTROL SYSTEM FOR INFLATABLE EVACUATION SLIDE

CROSS REFERENCE TO RELATED APPLICATIONS

This application claims priority to and the benefit of India Patent Application No. 202041020616, filed on May 15, 2020 and entitled "STRETCH CONTROL SYSTEM FOR INFLATABLE EVACUATION SLIDE," which is hereby incorporated by reference in its entirety for all purposes.

FIELD

The present disclosure relates generally to inflatable evacuation systems and, more particularly, to methods and apparatus used to control inflation of such inflatable evacuation systems.

BACKGROUND

Inflatable evacuation systems may be found on various structures, including aircraft, boats, offshore drilling platforms and the like. The systems are typically equipped with an inflatable device, such as, for example, an inflatable slide or an inflatable raft, configured to facilitate rapid evacuation of persons in the event of an emergency. The slides or rafts are typically stored in an uninflated condition on the structure—e.g., a commercial aircraft—in a location readily accessible for deployment.

Systems used to inflate evacuation slides typically employ a gas stored within a cylinder or tank at high pressure, which is discharged into an inflatable within a specific time period. This may be accomplished by opening a main inflation valve that connects the high-pressure gas to the evacuation slide. Current systems are often open loop control systems, designed to maintain a constant pressure in the evacuation slide or raft once discharged. Since fast inflation times for an evacuation slide or raft is important, most inflation systems will have excess gas in the storage cylinder or tank to adjust for variations in ambient temperature and gas supply lines. The inflatable is also provided with one or more pressure relief valves to vent the excess gas after the inflatable is charged to the set pressure of the pressure relief valve.

During inflation, as charge flows from the cylinder to the inflatable, the gas expands and flows into the inflatable. The continuous entry of fresh charge into the inflatable results in an increase in pressure within the inflatable. The inflatable primarily consists of a fabric that has a finite elasticity. As a result, the fabric will stretch in response to the pressure increasing inside the inflatable during the inflation process. The stretch properties of the inflatable fabric vary with temperature. At higher temperatures, the stretch will be higher than the stretch observed in the inflatable at room temperature when inflated to the same pressure. Accordingly, the stretch experienced by the inflatable will vary as a function of pressure and temperature. Monitoring the elastic stretch of the inflatable during inflation at a specific temperature may thus provide a closed loop check on the pressure within the inflatable during the inflation process.

SUMMARY

An inflation control system for an inflatable is disclosed. In various embodiments, the inflation control system includes a source of a pressurized gas; a valve module connected to the source of the pressurized gas and configured to control a flow of the pressurized gas to the inflatable; a stretch sensor configured for mounting to the inflatable and to provide a real-time stretch data of an elastic deformation of the inflatable; and a controller configured to receive the real-time stretch data and to transmit a control signal to the valve module to control the flow of the pressurized gas to the inflatable.

In various embodiments, the valve module includes a main pneumatic valve configured to start and to stop the flow of the pressurized gas. In various embodiments, the valve module includes a normally closed control valve connected to the controller and configured to operate the main pneumatic valve. In various embodiments, the valve module includes a pressure regulator valve.

In various embodiments, a temperature sensor is configured for mounting to the inflatable and to provide a real-time temperature data of the inflatable. In various embodiments, the controller includes a stretch-temperature database configured to compensate the real-time stretch data based on the real-time temperature data and to generate a compensated stretch signal. In various embodiments, the controller is configured to compare the compensated stretch signal against a cutoff pressure value and to stop the flow of the pressurized gas to the inflatable if the compensated stretch signal indicates a pressure within the inflatable exceeds the cutoff pressure value. In various embodiments, the controller is configured to compare the compensated stretch signal against a cutoff stretch value and to stop the flow of the pressurized gas to the inflatable if the compensated stretch signal exceeds the cutoff stretch value.

In various embodiments, an aspirator is disposed downstream of the valve module and configured for connection to the inflatable. In various embodiments, the source of the pressurized gas is at least one of a gas storage tank, a gas cylinder, a gas bottle or a gas generator.

An evacuation system for an aircraft is disclosed. In various embodiments, the evacuation system includes an inflatable tube; a source of a pressurized gas; a valve module connected to the source of the pressurized gas and configured to control a flow of the pressurized gas to the inflatable tube; a stretch sensor mounted to the inflatable tube and configured to provide a real-time stretch data of an elastic deformation of the inflatable tube; and a controller configured to receive the real-time stretch data and to transmit a control signal to the valve module to control the flow of the pressurized gas to the inflatable tube.

In various embodiments, the valve module includes a main pneumatic valve configured to start and to stop the flow of the pressurized gas. In various embodiments, the valve module includes a normally closed control valve connected to the controller and configured to operate the main pneumatic valve.

In various embodiments, the system includes a temperature sensor mounted to the inflatable tube and configured to provide a real-time temperature data of the inflatable tube. In various embodiments, the controller includes a stretch-temperature database configured to compensate the real-time stretch data based on the real-time temperature data and to generate a compensated stretch signal.

In various embodiments, the controller is configured to compare the compensated stretch signal against a cutoff pressure value and to stop the flow of the pressurized gas to the inflatable tube if the compensated stretch signal indicates a pressure within the inflatable tube is greater than the cutoff pressure value. In various embodiments, the controller is configured to compare the compensated stretch signal against the cutoff pressure value and to start the flow of the pressurized gas to the inflatable tube if the compensated stretch signal indicates the pressure within the inflatable tube is less than the cutoff pressure value.

In various embodiments, the controller is configured to compare the compensated stretch signal against a cutoff stretch value and to stop the flow of the pressurized gas to the inflatable tube if the compensated stretch signal exceeds the cutoff stretch value. In various embodiments, the controller is configured to compare the compensated stretch signal against a cutoff stretch value and to start the flow of the pressurized gas to the inflatable tube if the compensated stretch signal is less than the cutoff stretch value. In various embodiments, the system includes an aspirator disposed downstream of the valve module and configured for connection to the inflatable tube.

A method for controlling inflation of an inflatable is disclosed. In various embodiments, the method includes: opening a valve module connected to a source of a pressurized gas and configured to control a flow of the pressurized gas to the inflatable; monitoring a stretch sensor mounted to the inflatable to provide a real-time stretch data of an elastic deformation of the inflatable; monitoring a temperature sensor mounted to the inflatable to provide a real-time temperature data of the inflatable; generating a compensated stretch signal based on a comparison of the real-time stretch data and the real-time temperature data against a thermal compensation database; and controlling operation of the valve module based on the compensated stretch signal.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
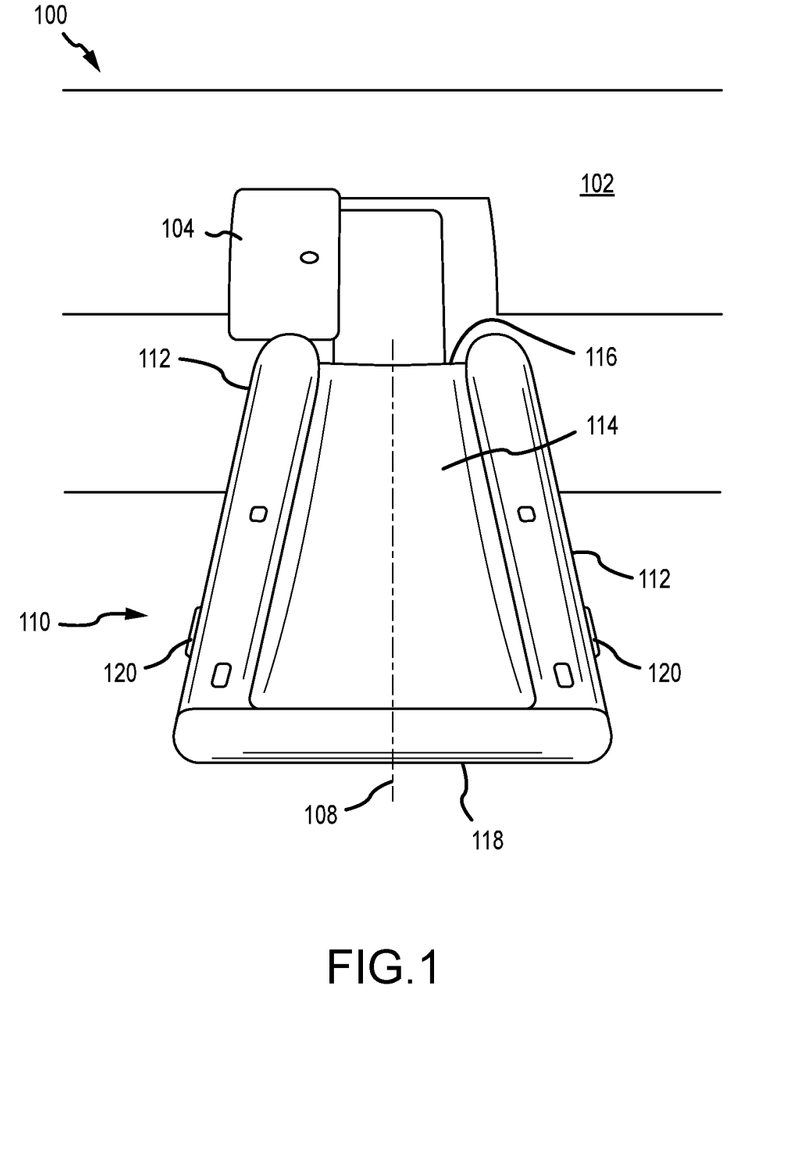
FIG. 1 is a schematic view of an evacuation slide coupled to an aircraft, in accordance with various embodiments.

Referring to FIG. 1, an aircraft 100 having an evacuation slide 110, according to various embodiments, is illustrated. The aircraft 100 may include a fuselage 102 with wings fixed to the fuselage 102. An emergency exit door 104 may be disposed on the fuselage 102 over one of the wings or at some other location along a length of the fuselage 102. The evacuation slide 110 and other components of an evacuation system may be housed within a pack-board housing or other compartment mounted to the aircraft 100. The evacuation system may jettison a blowout panel to deploy the evacuation slide 110, such as, for example, an inflatable evacuation slide, in response to the emergency exit door 104 opening or in response to another evacuation event. FIG. 1 schematically depicts the evacuation slide 110 in a deployed state, extending from the fuselage 102 of the aircraft 100. During deployment, an inflatable tube 112 (or a plurality of inflatable tubes) is inflated using an inflation system that is typically configured to deliver a pressurized gas to the inflatable tube 112. The evacuation slide may comprise a sliding surface 114 secured to the inflatable tube 112 and configured for sliding passenger egress from the emergency exit door 104 of the aircraft 100 to a surface on the ground in the event of an evacuation on land or to a water surface in the event of an evacuation on a lake, river or ocean. In various embodiments, the evacuation slide 110 includes a longitudinal axis 108 that extends from a first or a proximal end 116 (or a head portion) to a second or a distal end 118 (or a foot portion). As described further below, in various embodiments, the evacuation slide 110 may comprise a stretch sensor 120 (or a plurality of stretch sensors) disposed on the inflatable tube 112 (or on each inflatable tube comprised within the evacuation slide 110).

Figure 2:
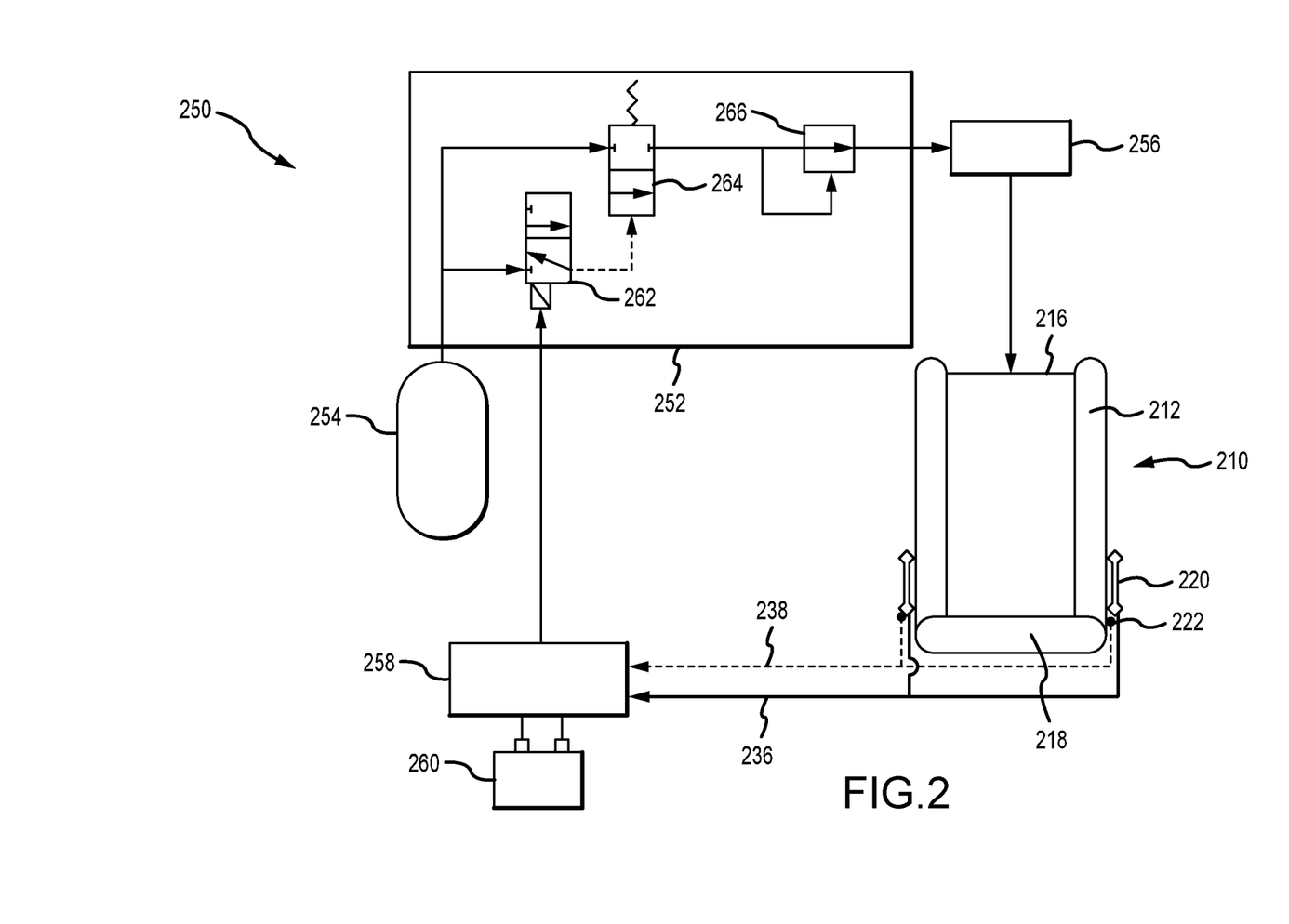
FIG. 2 is schematic view of an inflation control system, in accordance with various embodiments.

Referring now to FIG. 2, an inflation control system 250 coupled to an inflatable, such as, for example, an evacuation slide 210 that is similar to the evacuation slide 110 described above, is illustrated. While the disclosure provided herein focuses on inflation of evacuation slides, it will be appreciated that the inflation control system 250 may be applied to other inflatables, such as, for example, life-rafts or balloons or the like. Similar to the description above, the evacuation slide 210 may include an inflatable tube 212 and a proximal end 216 (or a head portion) configured for attachment to a structure, such as, for example, an aircraft, and a distal end 218 (or a foot portion) spaced a length of the evacuation slide from the proximal end 216. A stretch sensor 220 is mounted on the inflatable tube 212 and is configured to sense or monitor an elastic stretch or an elastic deformation of the fabric comprising the inflatable tube 212 during an inflation process. A temperature sensor 222 is also mounted on the inflatable tube 212 and is configured to sense or monitor the temperature of the inflatable tube 212 (or the ambient temperature surrounding the inflatable tube 212) during the inflation process. Real-time data concerning the temperature of the inflatable tube 212 (or a real-time temperature data) and the elastic stretch experienced by the inflatable tube 212 (or a real-time stretch data) during the inflation process may then be used to determine the pressure within the inflatable tube 212 on a real-time basis during the inflation process.

Still referring to FIG. 2, the inflation control system 250 includes a valve module 252, a storage vessel 254 filled with a high-pressure gas (or, in various embodiments, a gas generator configured to generate a high-pressure gas), an aspirator 256, a controller 258 and a power source 260, such as, for example, a battery or charged capacitor. In various embodiments, the power source 260 is a dedicated source configured to power the stretch sensor 220 and the temperature sensor 222 mounted on the inflatable tube 212, as well as each of the valve module 252 and the controller 258. To provide a dedicated source of direct current power, the power source 260 may comprise, for example, a lithium-ion battery or an ultracapacitor, each configured to store energy at a high density for controlling the rapid sequence of events that occur during an inflation process of the evacuation slide 210. As illustrated in FIG. 2, real time data from the stretch sensor 220 is transmitted to the controller 258 via a stretch sensor bus 236, while real-time data from the temperature sensor 222 is transmitted to the controller via a temperature sensor bus 238. In various embodiments, the controller 258 may include a general-purpose processor, a digital signal processor (DSP), an application specific integrated circuit (ASIC), a field programmable gate array (FPGA) or some other programmable logic device, discrete gate or transistor logic, discrete hardware components, or any combination thereof.

In further detail, the valve module 252 is configured to open and close a main pneumatic valve 264 based on a control signal received from the controller 258. More specifically, based on preset control logic (that is typically specific to the materials used to construct a particular inflatable) and the real-time data received from the stretch sensor 220 and the temperature sensor 222, the controller 258 opens or closes the main pneumatic valve 264 in order to turn on or turn off the flow of high-pressure gas from the storage vessel 254, to the aspirator 256 and then to the inflatable tube 212 of the evacuation slide 210. In various embodiments, the valve module 252 may further comprise a normally closed control valve 262, such as, for example, a three-way, two-position normally closed control valve configured to operate the main pneumatic valve 264 between an open position and a closed position. In various embodiments, the valve module 252 may also include a pressure regulator valve 266 configured to prevent the occurrence of an over-pressure situation at the aspirator 256 or the inflatable tube 212.

Figure 3A:
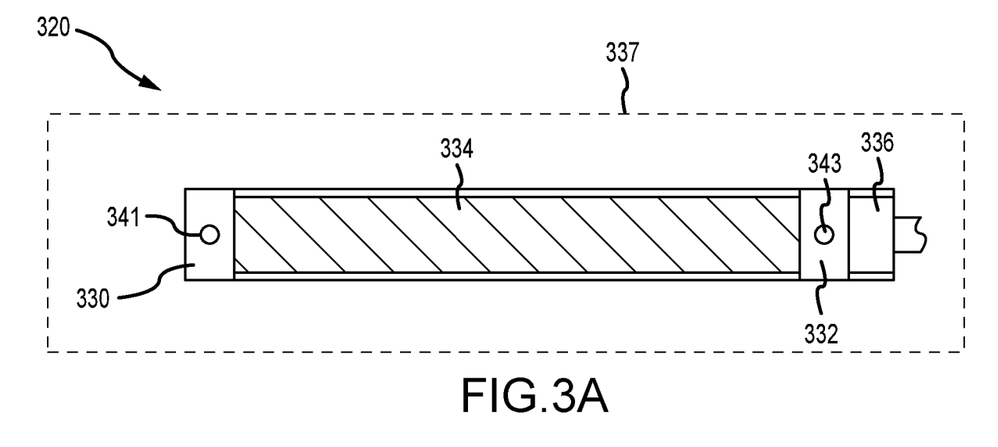
FIGS. 3A and 3B are schematic views of a stretch sensor for an evacuation slide, in accordance with various embodiments.
Figure 3B:
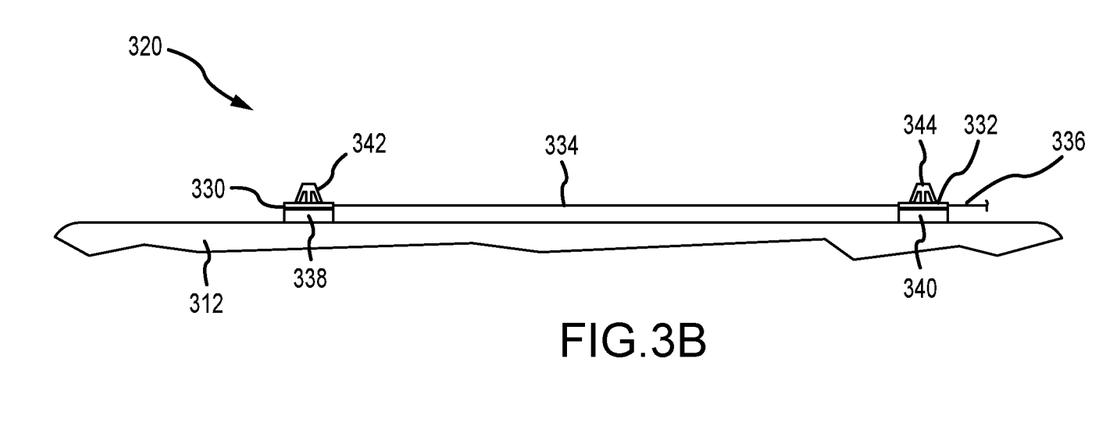

Referring now to FIGS. 3A and 3B, a stretch sensor 320, similar to the stretch sensor 220 described above with reference to FIG. 2, is illustrated. The stretch sensor 320 includes a sensing material 334, which may be either capacitance-based or resistance-based. For example, in various embodiments, the sensing material 334 comprises a capacitance-based material. Such capacitance-based stretch sensors exhibit minimal hysteresis during cyclic and creep tests and behave similar to a flexible parallel plate capacitor, comprising two conductive electrodes separated by a dielectric. When the stretch sensor 320 is stretched, its capacitance increases proportionate to the amount of stretch to which it is subjected. The stretch sensor 320 includes a first mounting tab 330 and a second mounting tab 332, between which the sensing material 334 is disposed. In various embodiments, the first mounting tab 330 is attached to an inflatable tube 312 (similar to the inflatable tube 212 described above) via a first adhesive backing member 338. Similarly, the second mounting tab 332 is attached to the inflatable tube 312 via a second adhesive backing member 340. In various embodiments, the first mounting tab 330 includes a first aperture 341 configured to engage a first standoff pin 342 extending from the first adhesive backing member 338 and the second mounting tab 332 includes a second aperture 343 configured to engage a second standoff pin 344 extending from the second adhesive backing member 340. A stretch sensor bus 336 (similar to the stretch sensor bus 236 described above) is connected to the sensing material 334 and configured to receive power from and to transmit real-time sensor data to a controller, such as the controller 258 described above. As the two mounting tabs move apart from one another as a result of the inflatable tube 312 being elastically deformed, the sensing material 334 will stretch and generate an electrical signal (or control signal) proportional to the degree of stretch, with the electrical signal transmitted to the controller via the stretch sensor bus 336. In various embodiments, the elasticity of the sensing material 334 will generally be greater than the elasticity of the inflatable tube 312, so as not to provide interference or resistance against the elastic deformation of the inflatable tube 312.

In various embodiments, the stretch sensor 320, when coupled to the inflatable tube 312, is covered by a pouch 337 that may also be adhered to the inflatable tube 312. The pouch 337 protects the stretch sensor 320 from harsh environments, such as, for example, saltwater. As described above, in various embodiments, the stretch sensor 320 is mounted to the inflatable tube 312 using the first standoff pin 342 and the second standoff pin 344. However, in various embodiments, the first mounting tab 330 and the second mounting tab 332 may be bonded directly to the fabric of the inflatable tube 312. Regardless of the manner of mounting, in various embodiments, the stretch sensor 320 may be mounted to the inflatable tube 312 with a slight amount of pre-stretch to account for manufacturing tolerances between the mounting tabs. The nominal output of the stretch sensor 320 may then be reset to zero or offset-corrected during a calibration process with an inflation control system, such as, for example, the inflation control system 250 described above.

During a calibration process, the stretch sensor 320 is calibrated to establish a functional relationship between a degree of stretch and a degree of electrical output or signal strength reflective of the degree of stretch. The calibration is performed over a range of temperatures likely to be encountered during an inflation process. Based on the calibration process, a stretch-temperature database (or a thermal compensation database) is developed and embedded into the controller. The stretch-temperature database will generally include information defining a relationship between the degree of stretch provided by the stretch sensor 320 as a function of temperature sensed by the temperature sensor. In other words, the stretch-temperature database will enable the controller to determine a value of pressure within the inflatable tube 312 based on two values—the degree of stretch reported by the stretch sensor 320 and the temperature of either the inflatable tube 312 or the ambient temperature surrounding the inflatable tube 312. In various embodiments, the stretch-temperature database will include a cutoff pressure value that is equivalent or approximately equivalent to a pressure relief value used in pressure relief valves attached to currently used systems, thereby obviating the need to incorporate pressure relief valves into the inflatable tube 312. As described further below with reference to FIG. 4, rather than a cutoff pressure value, the stretch-temperature database may include a cutoff stretch value that may provide a more direct comparison against the degree of stretch reported by the stretch sensor 320. Generally speaking, the cutoff pressure value and the cutoff stretch value will be indicative of equivalent levels of pressure within the inflatable tube 312.

Figure 4:
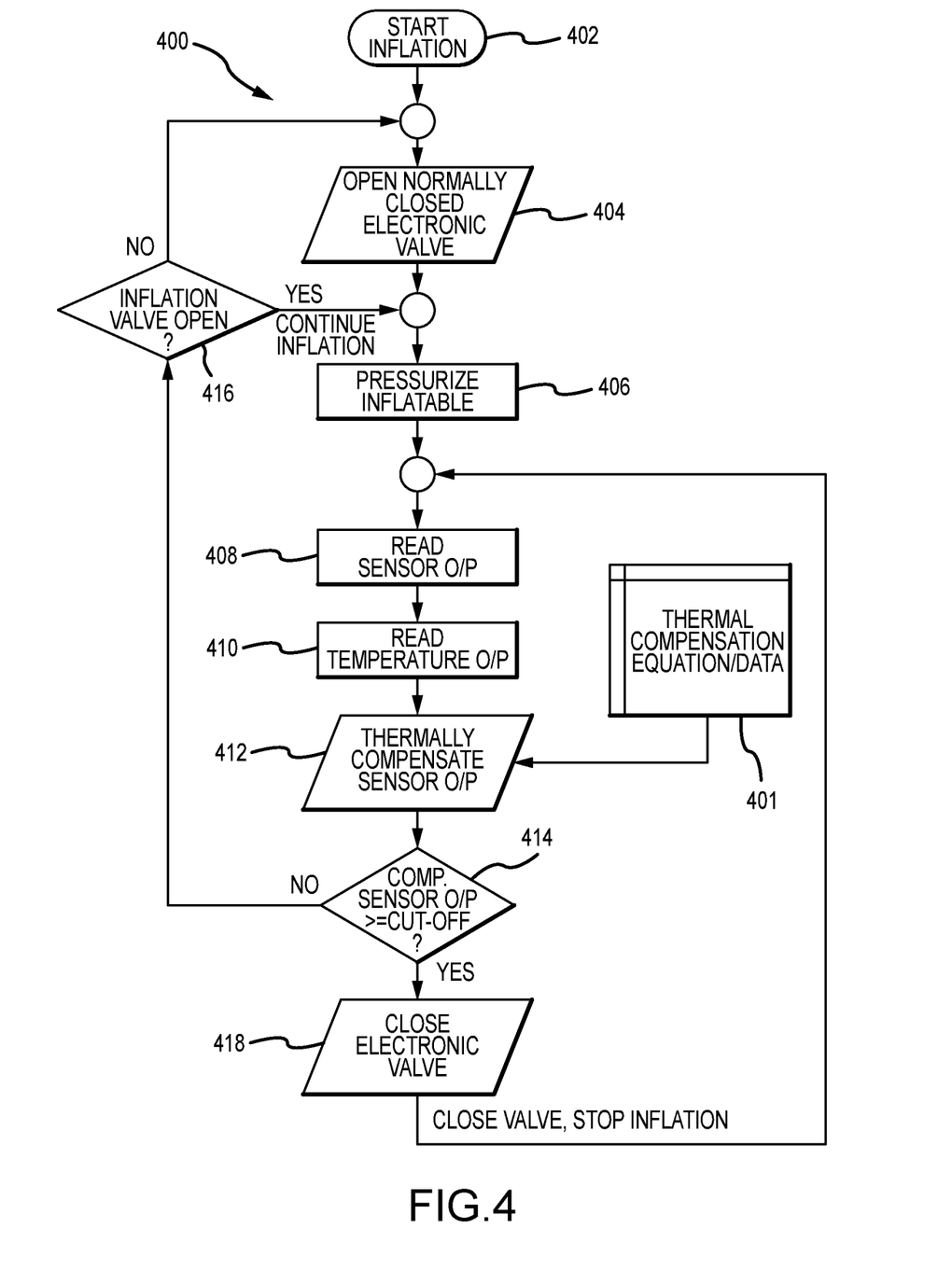
FIG. 4 is a flowchart describing various steps employed during inflation of an evacuation slide, in accordance with various embodiments.

Referring now to FIG. 4, a flowchart describing various steps employed during an inflation process of an evacuation slide is provided. In describing the various steps, reference is made to the components of the inflation control system 250 described above with reference to FIG. 2. In a first step 402, a decision to inflate the evacuation slide 210 is made and reported to the controller 258. At a second step 404, the controller 258 transmits a control signal to the valve module 252 to open the main pneumatic valve 264. In various embodiments, opening the main pneumatic valve is accomplished by activating the normally closed control valve 262. Following opening the main pneumatic valve 264, the evacuation slide begins pressurization at a third step 406. At a fourth step 408 and a fifth step 410, the controller 258 reads real time data from the stretch sensor 220 and the temperature sensor 222. The real-time data from the stretch sensor 220 and the temperature sensor 222 is then compared against a stretch-temperature database (or a thermal compensation database 401) and compensated to provide a compensated stretch signal according to the temperature reported by the temperature sensor 222 at a sixth step 412.

At a seventh step 414, the compensated stretch signal is compared against a cutoff pressure value (e.g., the cutoff pressure value that is equivalent or approximately equivalent to the pressure relief value used in current systems). If the compensated stretch signal indicates a pressure within the inflatable tube 212 is less than or equal to the cutoff pressure value, then the controller 258 performs a query at an eighth step 416 to determine the status of the main pneumatic valve. If the main pneumatic valve 264 is open, then the controller 258 continues pressurization of the inflatable tube 212 using the current configuration, or, if the main pneumatic valve 268 is closed, then the controller 258 returns to the second step 404, where the main pneumatic valve 268 is re-opened and the inflation process continues. Returning to the seventh step 414, if the compensated stretch signal indicates a pressure within the inflatable tube 212 is greater than the cutoff pressure value, then the controller 258 directs the main pneumatic valve 264 to close, thereby halting the flow of pressurized gas to the inflatable tube 212 at a ninth step 418. Likewise, if the compensated stretch signal is less than or equal to a cutoff stretch value, then the controller 258 performs the query at the eighth step 416 and continues operation as described above and if, on the other hand, the compensated stretch signal is greater than the cutoff stretch value, then the controller 258 directs the main pneumatic valve 264 to close, thereby halting the flow of pressurized gas to the inflatable tube 212 at the ninth step 418.

As illustrated in the flowchart 400, regardless of whether the flow of pressurized gas to the inflatable tube 212 continues or is halted, the monitoring of the stretch sensor 220 and the temperature sensor 222 continues in a cyclic fashion, enabling the controller 258 to open and close the main pneumatic valve 264 in real-time during the inflation process depending on fluctuations of the pressure within the inflatable tube 212. For example, after the main pneumatic valve 264 is closed, if the compensated stretch signal indicates a pressure within the inflatable tube 212 has decreased to less than the cutoff pressure value (or the stretch cutoff value), then the controller 258 opens the main pneumatic valve 264 again to continue the flow or pressurized gas to the inflatable tube 212. Accordingly, the compensated stretch signal becomes a control variable, where the pressure within the inflatable tube 212 (or the stretch value representative of deformation of the inflatable tube 212) is maintained within a tolerance band during the inflation process by actuating and de-actuating the main pneumatic valve 264 for one or more cycles. In such fashion, the main pneumatic valve may be operated in a pulse-width controlled manner to maintain the pressure (or the degree of stretch) within the tolerance band.

Figure 5A:
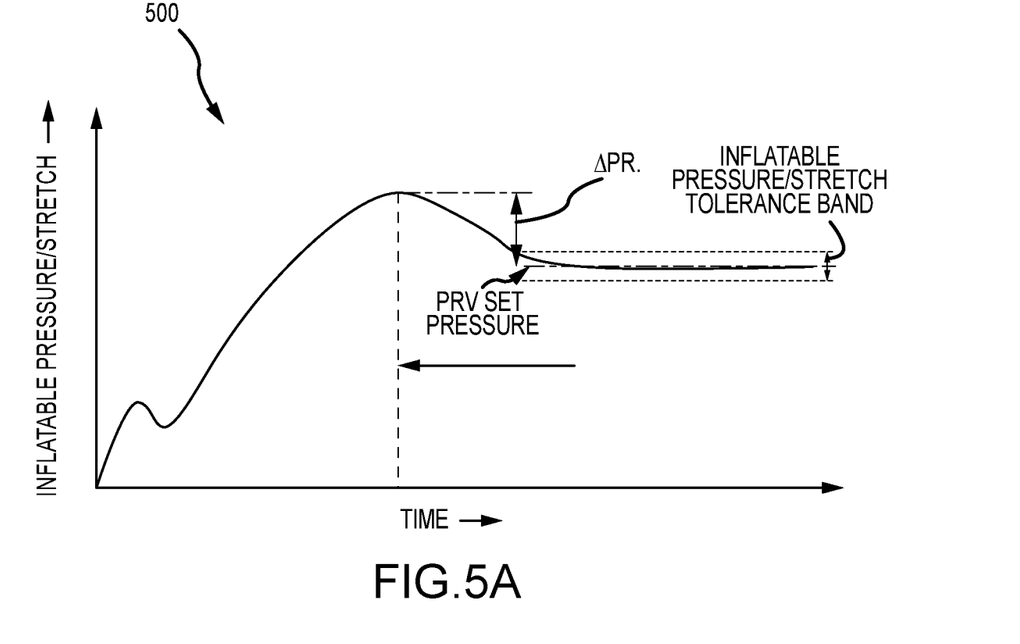
FIGS. 5A and 5B illustrate typical response characteristics during inflation of an evacuation slide, in accordance with various embodiments.
Figure 5B:
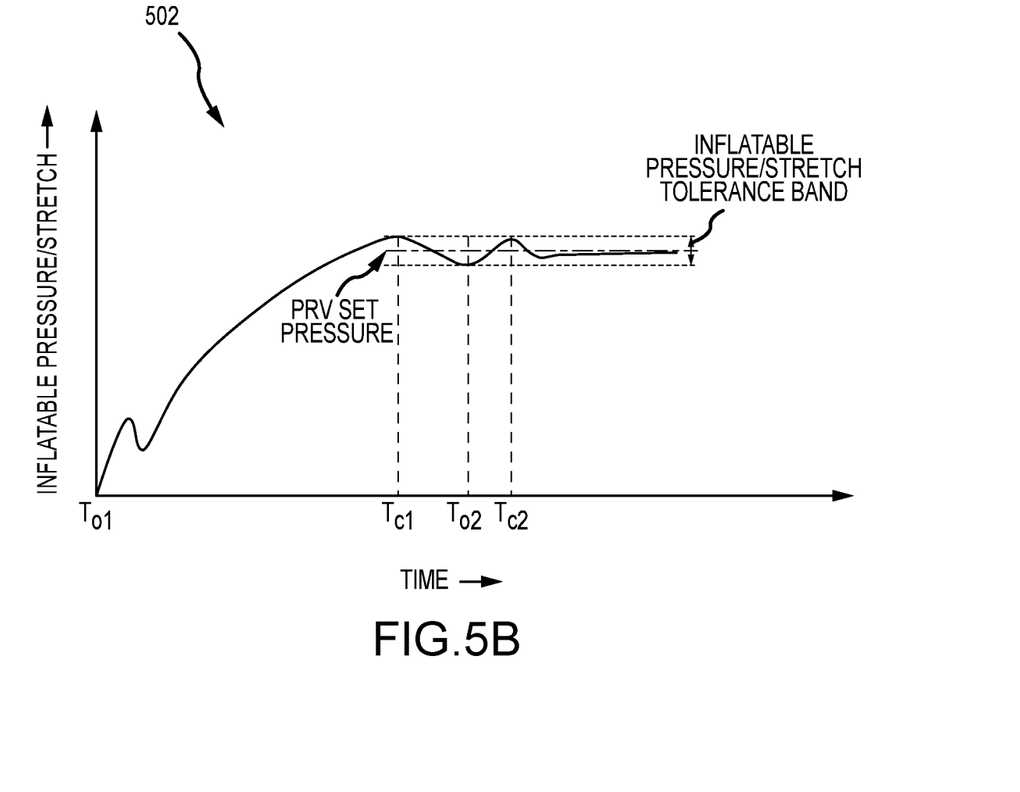

Referring to FIGS. 5A and 5B, two manners of operation of the inflation control system 250 are illustrated. Both graphs illustrate the compensated stretch signal as a function of time and the manner in which the inflation control system 250 responds as a result. Referring to FIG. 5A, for example, the pressure within the inflatable tube 212 increases until the compensated stretch signal indicates the cutoff pressure value (or cutoff stretch value) has been reached, at which point the controller 258 closes the main pneumatic valve 264 and the pressure within the inflatable tube 212 relaxes or drops off to achieve a desired pressure within an inflatable pressure tolerance band (or stretch tolerance band). Because the main pneumatic valve 264 opens and closes only once, this tolerance band must typically be relatively wide for this mode of operation to maintain the desired pressure or stretch with the tolerance band. Referring to FIG. 5B, the pressure within the inflatable tube 212 (or the stretch of the inflatable tube 212) increases from time To1 until the compensated stretch signal indicates the pressure or stretch has reached an upper level of the inflatable pressure or stretch tolerance band, at which point the controller 258 closes the main pneumatic valve 264 at time Tc1. The compensated stretch signal the indicates the pressure within the inflatable tube 212 (or the stretch of the inflatable tube 212) has relaxed or dropped off to a lower level of the tolerance band, at which point the controller 258 opens the main pneumatic valve 264 at time To2. As illustrated, the main pneumatic valve is closed once again at time Tc2 when the compensated stretch signal indicates the pressure within the inflatable tube 212 (or the stretch of the inflatable tube 212) has again reached the upper level of the tolerance band. Because of the cycled opening and closing of the main pneumatic valve 264 represented by FIG. 5B, the inflatable pressure/stretch tolerance band may be relatively narrower than that illustrated in FIG. 5A.

The inflation control system described above provides several benefits over existing systems. Existing inflation systems, for example, use a passive open-loop control mode of inflatable pressure control using pressure relief valves assembled to the inflatable. This inflation control system described herein uses inflatable stretch control to provide a closed loop control system thereby monitoring the elastic stretch of the fabric comprising the inflatable tube in response to pressure build up during the inflation process. The current design eliminates hard spots on the fabric and potential sources of leakage from the inflatable tube in the regions of the pressure regulator valves. The stretch sensors being flexible, they can easily conform to the geometry of the inflatable tube. Further, once the inflatable tube attains the desired pressure or stretch, excess gas flow is halted by the controller at the source of the high-pressure gas. This enables increasing the operating pressure of the inflatable and a reduction in tube diameter to achieve the same tube strength. This also enables a reduction in the effective volume of the inflatable tube and the quantity of fabric used to construct the inflatable tube. Since the stretch-temperature database is preset with the final desired stretch, it remains the same at all temperatures. However, the inflatable pressure varies with temperature due to thermal expansion. The self-monitoring and automatic control provides additional information about the health aspects of inflatable in terms of any stretch degradation, if present. Once the final stretch is determined, the system may provide information about the amount of gas actually consumed for inflation since the gas is not vented away from the system. This may provide input data to determine the inflation gas required from the cylinder and assist in accurately sizing the storage tank, cylinder, bottle or generator for the pressurized gas. Eliminating the pressure relief valves from inflatable also reduces the maintenance requirements.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. An inflation control system for an inflatable, comprising:
    a source of a pressurized gas;
    a valve module connected to the source of the pressurized gas and configured to control a flow of the pressurized gas to the inflatable;
    a stretch sensor configured for mounting to the inflatable and to provide a real-time stretch data of an elastic deformation of the inflatable;
    a temperature sensor mounted to the inflatable and configured to provide a real-time temperature data of the inflatable; and
    a controller configured to receive the real-time stretch data and to transmit a control signal to the valve module to control the flow of the pressurized gas to the inflatable, wherein the controller includes a stretch-temperature database configured to compensate the real-time stretch data based on the real-time temperature data and to generate a compensated stretch signal.

2. The inflation control system of claim 1, wherein the valve module includes a main pneumatic valve configured to start and to stop the flow of the pressurized gas.

3. The inflation control system of claim 2, wherein the valve module includes a normally closed control valve connected to the controller and configured to operate the main pneumatic valve.

4. The inflation control system of claim 3, wherein the valve module includes a pressure regulator valve.

5. The inflation control system of claim 1, wherein the controller is configured to compare the compensated stretch signal against a cutoff pressure value and to stop the flow of the pressurized gas to the inflatable if the compensated stretch signal indicates a pressure within the inflatable exceeds the cutoff pressure value.

6. The inflation control system of claim 1, wherein the controller is configured to compare the compensated stretch signal against a cutoff stretch value and to stop the flow of the pressurized gas to the inflatable if the compensated stretch signal exceeds the cutoff stretch value.

7. The inflation control system of claim 1, further comprising an aspirator disposed downstream of the valve module and configured for connection to the inflatable.

8. The inflation control system of claim 7, wherein the source of the pressurized gas is at least one of a gas storage tank, a gas cylinder, a gas bottle or a gas generator.

9. An evacuation system for an aircraft, comprising:
   an inflatable tube;
   a source of a pressurized gas;
   a valve module connected to the source of the pressurized gas and configured to control a flow of the pressurized gas to the inflatable tube;
   a stretch sensor mounted to the inflatable tube and configured to provide a real-time stretch data of an elastic deformation of the inflatable tube;
   a temperature sensor configured to provide a real-time temperature data of the inflatable tube; and
   a controller configured to receive the real-time stretch data and to transmit a control signal to the valve module to control the flow of the pressurized gas to the inflatable tube, wherein the controller includes a stretch-temperature database configured to compensate the real-time stretch data based on the real-time temperature data and to generate a compensated stretch signal.

10. The evacuation system of claim 9, wherein the valve module includes a main pneumatic valve configured to start and to stop the flow of the pressurized gas.

11. The evacuation system of claim 10, wherein the valve module includes a normally closed control valve connected to the controller and configured to operate the main pneumatic valve.

12. The evacuation system of claim 11, wherein the temperature sensor is mounted to the inflatable tube.

13. The evacuation system of claim 9, wherein the controller is configured to compare the compensated stretch signal against a cutoff pressure value and to stop the flow of the pressurized gas to the inflatable tube if the compensated stretch signal indicates a pressure within the inflatable tube is greater than the cutoff pressure value.

14. The evacuation system of claim 13, wherein the controller is configured to compare the compensated stretch signal against the cutoff pressure value and to start the flow of the pressurized gas to the inflatable tube if the compensated stretch signal indicates the pressure within the inflatable tube is less than the cutoff pressure value.

15. The evacuation system of claim 9, wherein the controller is configured to compare the compensated stretch signal against a cutoff stretch value and to stop the flow of the pressurized gas to the inflatable tube if the compensated stretch signal exceeds the cutoff stretch value.

16. The evacuation system of claim 15, wherein the controller is configured to compare the compensated stretch signal against the cutoff stretch value and to start the flow of the pressurized gas to the inflatable tube if the compensated stretch signal is less than the cutoff stretch value.

17. A method for controlling inflation of an inflatable, comprising:
   opening a valve module connected to a source of a pressurized gas and configured to control a flow of the pressurized gas to the inflatable;
   monitoring a stretch sensor mounted to the inflatable to provide a real-time stretch data of an elastic deformation of the inflatable;
   monitoring a temperature sensor mounted to the inflatable to provide a real-time temperature data of the inflatable;
   generating a compensated stretch signal based on a comparison of the real-time stretch data and the real-time temperature data against a thermal compensation database; and
   controlling operation of the valve module based on the compensated stretch signal.

* * * * *